No. 751,371. PATENTED FEB. 2, 1904.
H. A. BIERLEY.
CHURN.
APPLICATION FILED APR. 13, 1903.
NO MODEL.
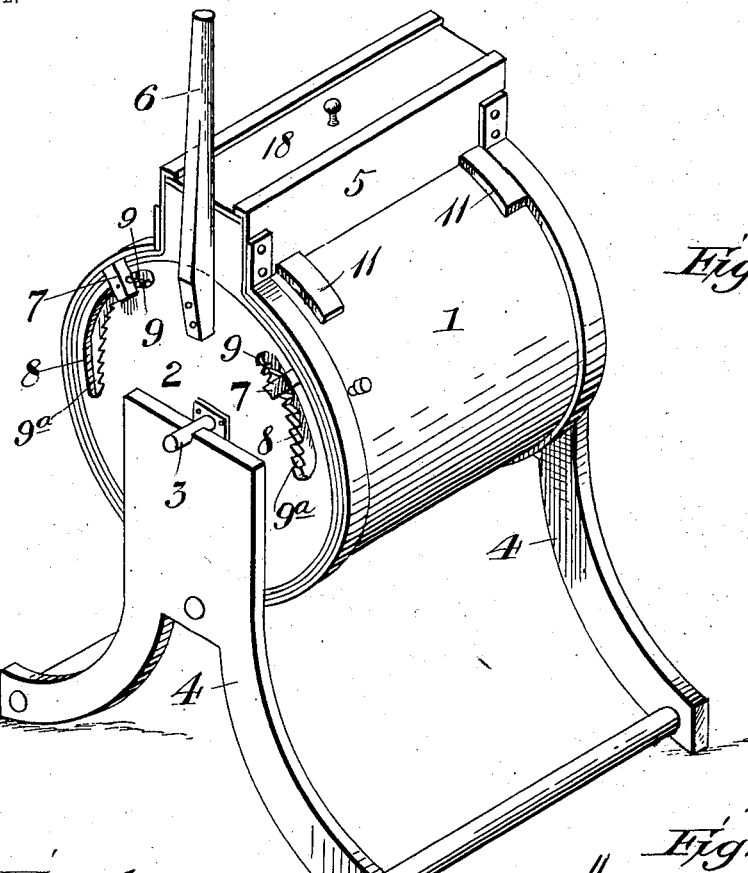
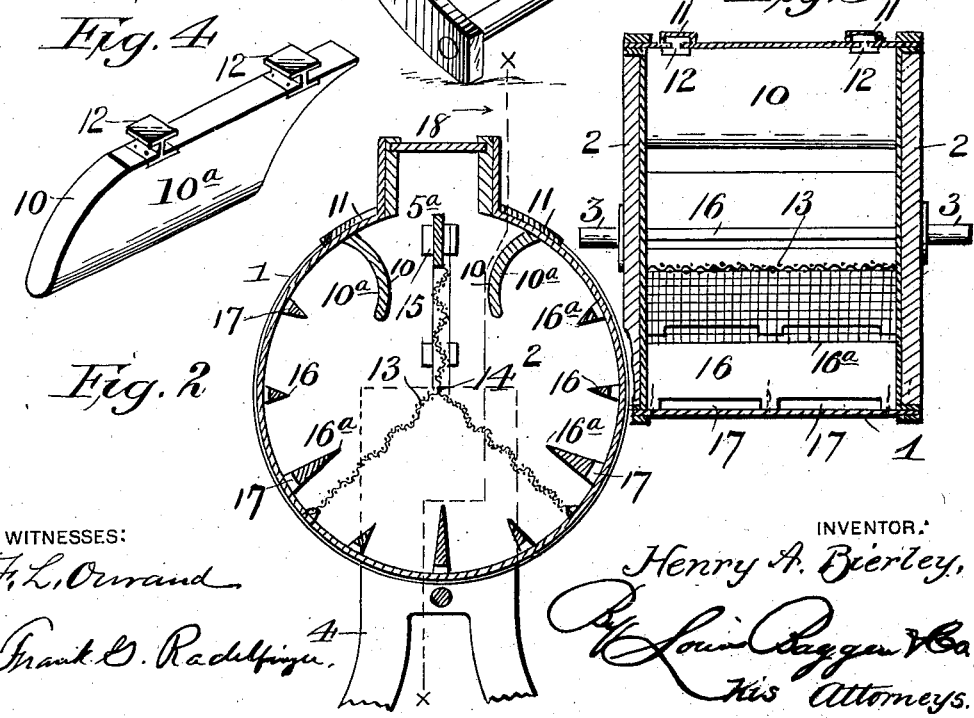
WITNESSES:
INVENTOR:
Henry A. Bierley, No. 751,371. Patented February 2, 1904.

UNITED STATES PATENT OFFICE.

HENRY A. BIERLEY, OF PORTSMOUTH, OHIO.

CHURN.

SPECIFICATION forming part of Letters Patent No. 751,371, dated February 2, 1904.

Application filed April 13, 1903. Serial No. 152,460. (No model.)

*To all whom it may concern:*

Be it known that I, HENRY A. BIERLEY, a citizen of the United States, residing at Portsmouth, in the county of Scioto and State of Ohio, have invented new and useful Improvements in Churns, of which the following is a specification.

My invention relates to churns; and the objects of the same are, first, to construct a rotating churn having transverse screen-partitions for breaking up the structure of the milk; second, to construct deflectors to limit the movement of the milk and in reversing its movement thereby increase the agitation thereof, and, third, to provide a series of riffles which will aid in producing waves or undulations in the milk, and thereby accelerate churning.

The simple and novel construction employed by me in carrying out my invention is fully described and claimed in this specification and illustrated in the accompanying drawings, forming a part thereof, in which—

Figure 1 is a perspective of my churn. Fig. 2 is a vertical transverse section of the same. Fig. 3 is a vertical longitudinal section of the drum. Fig. 4 is a detail perspective of one of the deflectors.

Like numerals of reference designate like parts in the different views of the drawings.

The numeral 1 designates a cylindrical churn having heads 2 therein bearing trunnions 3, which are journaled in frames 4. A mouthpiece 5 is provided, which is connected to the edges of an opening $5^a$ in the convex wall of the drum, which opening extends from head to head. A lever 6 for use in rocking the drum 1 is attached to one of the heads 2 and extends radially thereof. Adjustable stops 7, mounted on the heads 2, are located to engage the frames 4 when the drum 1 is rocked and limit its movement. These stops 7 are mounted in guide-grooves 8 and carry spring-catches 9, which engage racks $9^a$, seated in the grooves 8, to enable them to be set in any position desired, To limit the movement of the milk and reverse its motion, two curved deflectors 10 are mounted within the drum 1, adjacent and parallel to the long sides of the mouth 5 and aperture $5^a$. These deflecting-faces $10^a$ of the deflectors 10 are concave and extend almost radially the drum and about one-fourth the diametrical distance across it and have their backs turned toward the opening $5^a$. Guide-grooves 11 are formed in the concave face of the drum and are engaged by catches 12, mounted on the deflector 10 to enable them to be removed for cleaning when desired or to be adjusted at any point in said slots by inserting wedges alongside of said catches 12 should friction not be sufficient to hold them against accidental displacement.

To break up the structure of the cream, three radially-extending corrugated screens 13 are mounted in the drum. They are connected in the center at 14 and are detachably connected to the sides of the drum at 15.

In order to give the milk an undulating motion, riffles 16 are secured to the inside of the drum about twenty degrees apart. They extend radially and are beveled from the bottom to a knife-edge $16^a$ and are cut away at 17 to form slots to enable the milk to drain off of them. High riffles 16 alternate with lower ones as you pass around the inner circumference of the drum, with the exception that a low riffle is placed next to each of the deflectors 10, so that the reversal of the milk will not be interfered with. The mouth 5 is closed by a sliding lid 18.

In the operation of churning the drum is filled about one-half full of cream or milk, the lid 18 closed, the stops 7 adjusted to permit the rotation desired, and the lever 6 grasped and oscillated to churn the milk or cream. The milk will by its inertia lag behind the drum and be engaged in succession by the riffles 16 and lower screens 13 and then by the deflectors 10 and upper screen 13, which will give the milk an impetus to move in the direction in which the drum is turning. The direction of the lever 6 is then reversed and swung until the milk comes in contact with the other deflector 10, when the motion is again reversed. The position of the deflectors 10 may be adjusted to correspond to the swing of the levers.

I do not wish to be limited as to details of construction, as these may be modified in many particulars without departing from the spirit of my invention.

Having thus described my invention, what I claim as new, and desire to secure by Letters Patent, is—

1. In a churn, the combination of a drum for holding milk or cream and having an opening therein extending the full length of the drum, a deflector footed on the inner surface of said drum and adjacent to said opening and bearing feet engaging guide-grooves in said drum, substantially as described.

2. In a churn, the combination of a drum mounted to rotate, adjustable stops mounted to limit the movement of said drum, and deflectors adjustably mounted in guide-grooves within said drum to enable them to be set to correspond to said stops, substantially as described.

3. In a churn, the combination with a drum mounted to revolve, one of the heads of said drum having a curved guide-groove formed therein, racks mounted in said guide-groove, and a stop adjustably mounted in said groove and carrying a spring-pawl engaging said rack to enable the movement of the drum to be limited by setting said stops, substantially as described.

4. In a churn, the combination of a drum mounted to rotate, adjustable stops mounted to limit the rotation of said drum, and two concave deflectors adjustably mounted in said drum to enable them to be set to correspond to said stops substantially as described.

In testimony whereof I have hereunto set my hand in presence of two subscribing witnesses.

HENRY A. BIERLEY.

Witnesses:
AUGUST PETERSON,
BENNETT S. JONES.